US010549782B2

(12) United States Patent
Casali

(10) Patent No.: US 10,549,782 B2
(45) Date of Patent: Feb. 4, 2020

(54) FRAME-TO-BED ASSEMBLY

(71) Applicant: Frank Nick Casali, Shelby Township, MI (US)

(72) Inventor: Frank Nick Casali, Shelby Township, MI (US)

(73) Assignee: MAGNA INTERNATIONAL INC., Aurora (CA)

(*) Notice: Subject to any disclaimer, the term of this patent is extended or adjusted under 35 U.S.C. 154(b) by 37 days.

(21) Appl. No.: 15/754,308

(22) PCT Filed: Aug. 29, 2016

(86) PCT No.: PCT/US2016/049218
§ 371 (c)(1),
(2) Date: Feb. 22, 2018

(87) PCT Pub. No.: WO2017/040381
PCT Pub. Date: Mar. 9, 2017

(65) Prior Publication Data
US 2018/0257709 A1  Sep. 13, 2018

Related U.S. Application Data

(60) Provisional application No. 62/211,167, filed on Aug. 28, 2015.

(51) Int. Cl.
*B62D 21/03* (2006.01)
*B62D 33/02* (2006.01)
*B62D 27/02* (2006.01)

(52) U.S. Cl.
CPC ............. *B62D 21/03* (2013.01); *B62D 27/02* (2013.01); *B62D 33/02* (2013.01)

(58) Field of Classification Search
CPC ......... B62D 21/03; B62D 27/02; B62D 33/02
See application file for complete search history.

(56) References Cited

U.S. PATENT DOCUMENTS

| 4,128,271 A | 12/1978 | Gray |
| 5,938,272 A | 8/1999 | Jurica et al. |
| 8,276,967 B1* | 10/2012 | Ming-Shun ............. B60R 13/01 296/39.2 |
| 9,073,586 B1 | 7/2015 | Courtright et al. |
| 9,090,293 B1 | 7/2015 | Courtright et al. |
| 2004/0090077 A1* | 5/2004 | Montagna ............... B60R 13/01 296/39.2 |
| 2005/0040670 A1 | 2/2005 | Kikuchi et al. |
| 2005/0057075 A1 | 3/2005 | Edwards |
| 2009/0242108 A1* | 10/2009 | Montagna ............. B32B 37/153 156/244.19 |

(Continued)

FOREIGN PATENT DOCUMENTS

| CN | 2547577 Y | 4/2003 |
| CN | 1705582 A | 12/2005 |

(Continued)

*Primary Examiner* — Lori L Lyjak
(74) *Attorney, Agent, or Firm* — Dickinson Wright PLLC

(57) ABSTRACT

The aspects of the present disclosure include an improved frame-to-bed assembly, which allows the pickup bed to be attached directly to the pickup truck frame without or with the reduced use of cross-sills. Instead, the pickup bed is directly attached to the frame cross-members via an attachment assembly to retain the pickup bed in place.

20 Claims, 5 Drawing Sheets

(56) References Cited

U.S. PATENT DOCUMENTS

2011/0298245 A1   12/2011  Jarocki et al.
2015/0042125 A1*  2/2015  Bruggemann ....... B62D 25/025
                                              296/187.12
2017/0050681 A1*  2/2017  Slevinsky .......... B62D 25/2054

FOREIGN PATENT DOCUMENTS

| CN | 101443225 A | 5/2009 |
| CN | 101643086 A | 2/2010 |
| CN | 201613846 U | 10/2010 |
| CN | 104709409 A | 6/2015 |

\* cited by examiner

FRAME-TO-BED ASSEMBLY

CROSS REFERENCE TO RELATED APPLICATIONS

This U.S. National Stage Patent Application claims benefit of PCT Patent International Application Serial No. PCT/US2016/049218 filed on Aug. 29, 2016 entitled "Frame-To-Bed Assembly" which claims the benefit of U.S. Provisional Patent Application Ser. No. 62/211,167 filed on Aug. 28, 2015 entitled "Improved Frame-To-Box Assembly," the entire disclosures of the applications being considered part of the disclosure of this application and hereby incorporated by reference.

FIELD OF THE DISCLOSURE

The present disclosure generally relates to an improved frame-to-bed assembly for a pickup truck.

BACKGROUND OF THE DISCLOSURE

Pickup trucks are popular vehicles for consumers due to their relatively large size, power and versatility. Pickup trucks are often utilized for utility purposes like towing trailers or hauling items in a bed of the truck. Due to their relatively large size, pickup trucks also tend to have a relatively large mass.

Currently, beds of pickup trucks are typically attached to and supported by the truck's frame via multiple cross-sills. More specifically, the cross-sills are mounted such that they extend on top of, and between side rails of the frame. Pickup beds are often made out of steel which makes them heavy. On the other hand, it's known to make pickup beds out of lighter-weight materials such as aluminum, however such materials can be expensive. Additionally, the cross-sills used to support the pickup bed are usually made of metallic material such as steel to ensure adequate support for the bed and for even weight distribution along the frame. The use of the cross-sills results in added material and weight to an already heavy vehicle frame, which can lead to greater carbon emission and reduced fuel economy. The use of cross-sills may also contribute to a "loose lumber" noise and creates a higher center of gravity for the vehicle due to the combination of the pickup bed and cross-sill attachment.

In view of the foregoing, there is a need for an improved frame-to-bed assembly that reduces the weight of the pickup truck, is more cost efficient in assembly and production, and solves the problems discussed above.

SUMMARY OF THE DISCLOSURE

According to an aspect of the disclosure, a frame-to-bed assembly for a pickup truck is provided. The frame-to-bed assembly includes a frame that has a pair of rails that extend in spaced relationship with one another. At least one cross-member extends between the rails and connects the rails to one another. A bed that has a top surface and a bottom surface overlies the at least one cross-member and the rails, with the bottom surface facing the cross-member and the rails. The bed defines a plurality of corrugations. At least one mounting bracket is fixed to the bottom surface of the bed inside one of the corrugations and is coupled to the at least one cross-member for interconnecting the bed and the cross-member.

According to another aspect of the disclosure, an attachment assembly for a frame-to-bed assembly of a pickup truck is provided. The pickup truck includes a frame that has a pair of rails, at least one cross-member that extends between the rails, and a bed that has a top surface and a bottom surface. The bed defines a plurality of corrugations that each have a base and a pair of wings. The attachment assembly includes a mounting bracket that has a plate portion and a pair of arms that are each fixable to one of the wings of one of the corrugations along the bottom surface of the bed. Furthermore, a fastener is fixed to the mounting bracket and is fixable to the at least one cross-member to interconnect the bed and the cross-member.

These and other aspects of the present disclosure provide various advantages. For example, the improved frame-to-bed assembly eliminates or reduces the need for cross-sills and cross-members from supporting the pickup bed, as well as eliminates the need for brackets on the frame to support the cross-sills. As a result, the overall mass and torsional loading of the pickup truck is reduced and costs associated with the cross-sill, brackets, and pickup bed material, are reduced. Additionally, the improved frame-to-bed assembly may reduce noise coming from the pickup bed since the cross-sills are no longer required. Further, the floor of the pickup bed is lowered around 55 millimeters due to the elimination or reduction of the cross-sill and therefore, increases pickup box volume as well as makes the truck easier to load and unload due to the lowered floor. The center of gravity of the vehicle is also lowered due to the floor being lowered.

BRIEF DESCRIPTION OF THE DRAWINGS

Other aspects of the present disclosure will be readily appreciated, as the same becomes better understood by reference to the following detailed description when considered in connection with the accompanying drawings wherein.

DETAILED DESCRIPTION OF THE PRESENT DISCLOSURE

Detailed aspects of the present disclosure are provided herein; however, it is to be understood that the disclosed aspects are merely exemplary and may be embodied in various and alternative forms. It is not intended that these aspects illustrate and describe all possible forms of the disclosure. Rather, the words used in the specification are words of description rather than limitation, and it is understood that various changes may be made without departing from the spirit and scope of the disclosure. As those of ordinary skill in the art will understand, various features of the present disclosure as illustrated and described with reference to any of the Figures may be combined with features illustrated in one or more other Figures to produce examples of the present disclosure that are not explicitly illustrated or described. The combinations of features illustrated provide representative examples for typical applications. However, various combinations and modifications of the features consistent with the teachings of the present disclosure may be desired for particular applications or implementations. While examples of the disclosure have been illustrated and described, it is not intended that these examples illustrate and describe all possible forms of the disclosure. Rather, the words used in the specification are words of description rather than limitation, and it is understood that various changes may be made without departing from the spirit and scope of the disclosure. Additionally, the features and various implementing embodiments may be combined to form further examples of the disclosure.

The aspects disclosed herein provide an improved frame-to-bed assembly which allows the pickup bed to be attached to the pickup truck frame without the use of cross-sills. Instead, the pickup bed is directly attached the frame cross-members via an attachment assembly that includes a mounting bracket to reinforce and retain the pickup bed in place. The improved frame-to-bed assembly eliminates the need for cross-sills and frame brackets attached to the frame. As a result, the mass of the pickup truck is substantially reduced, and overall height of the bed can be reduced.

Figure 1:
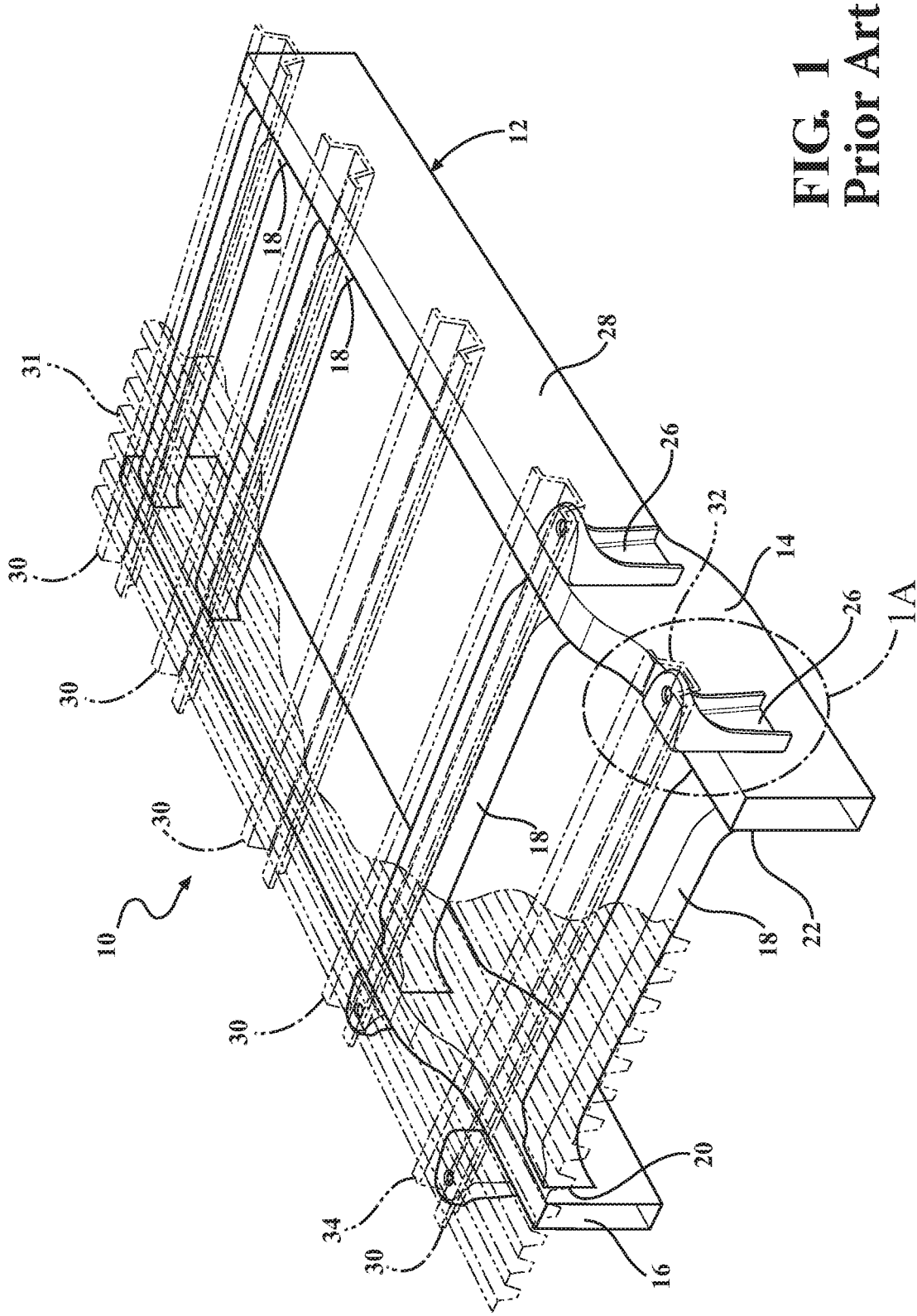
FIG. 1 is a perspective view of a current frame-to-bed assembly.

FIG. 1 is a perspective view of a current frame-to-bed assembly 10. The frame-to-bed assembly 10 includes a frame 12 that has two generally parallel rails 14 and 16. The rails 14 and 16 are connected through a plurality of cross-members 18. The cross-members 18 have a first end 20 and a second end 22. Each end 20, 22 of the cross-members 18 is welded to one of the rails 14, 16 of the frame 12, creating a ladder-like configuration. A plurality of brackets 26 are affixed to an outer portion 28 of the rails 14, 16, directly opposing the attachment location of the cross-members 18. The brackets 26 may or may not be flush with the rails 14, 16. A plurality of cross-sills 30 are disposed on the cross-members 18 and with each end 32, 34 attached to the brackets 26 to support and hold each cross-sill 30 in place. The cross-sills 30 are designed to support a floor of a pickup bed 31. The cross-sills 30 are made of steel such that they may support the mass of the pickup bed. The pickup bed 31 is typically made of steel or a non-ferrous material such as aluminum.

Figures 1A, 3:
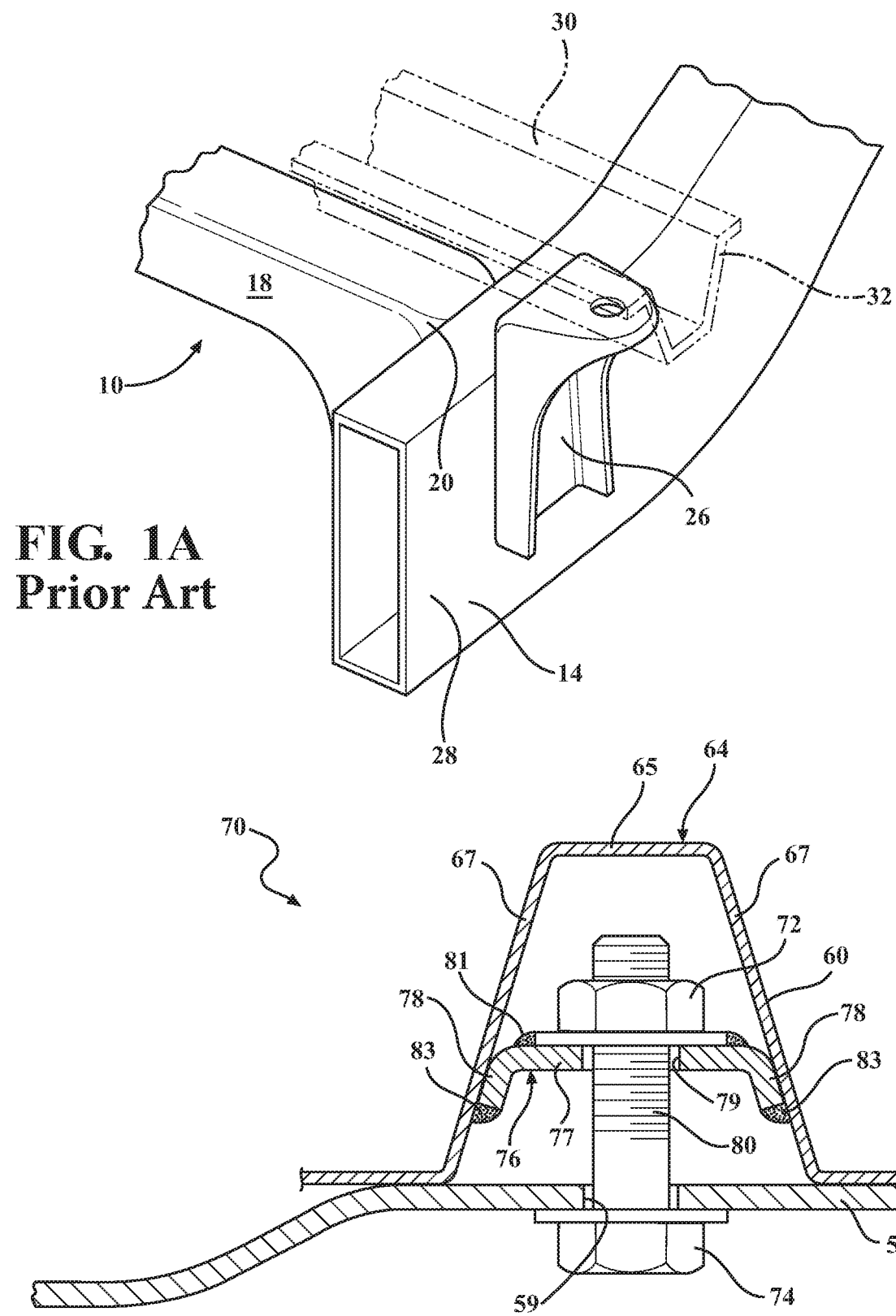
FIG. 1A is a sectional, magnified view of 1A from FIG. 1 which includes a current attachment assembly of a frame-to-bed assembly.
FIG. 3 is a sectional, magnified view of an improved attachment assembly of a frame-to-bed assembly in accordance with the present disclosure.

FIG. 1A is sectional, magnified view of A from FIG. 1, further illustrating the current frame-to-bed assembly 10. The bracket 26 is affixed to the outer portion 28 of the rail 14, as described in FIG. 1. The first end 20 of the cross-member 18 is attached to the rail 14 opposite of the bracket 26. A cross-sill 30 is disposed on the cross-member 18 and has an end 32 affixed to the bracket 26.

Figure 2:
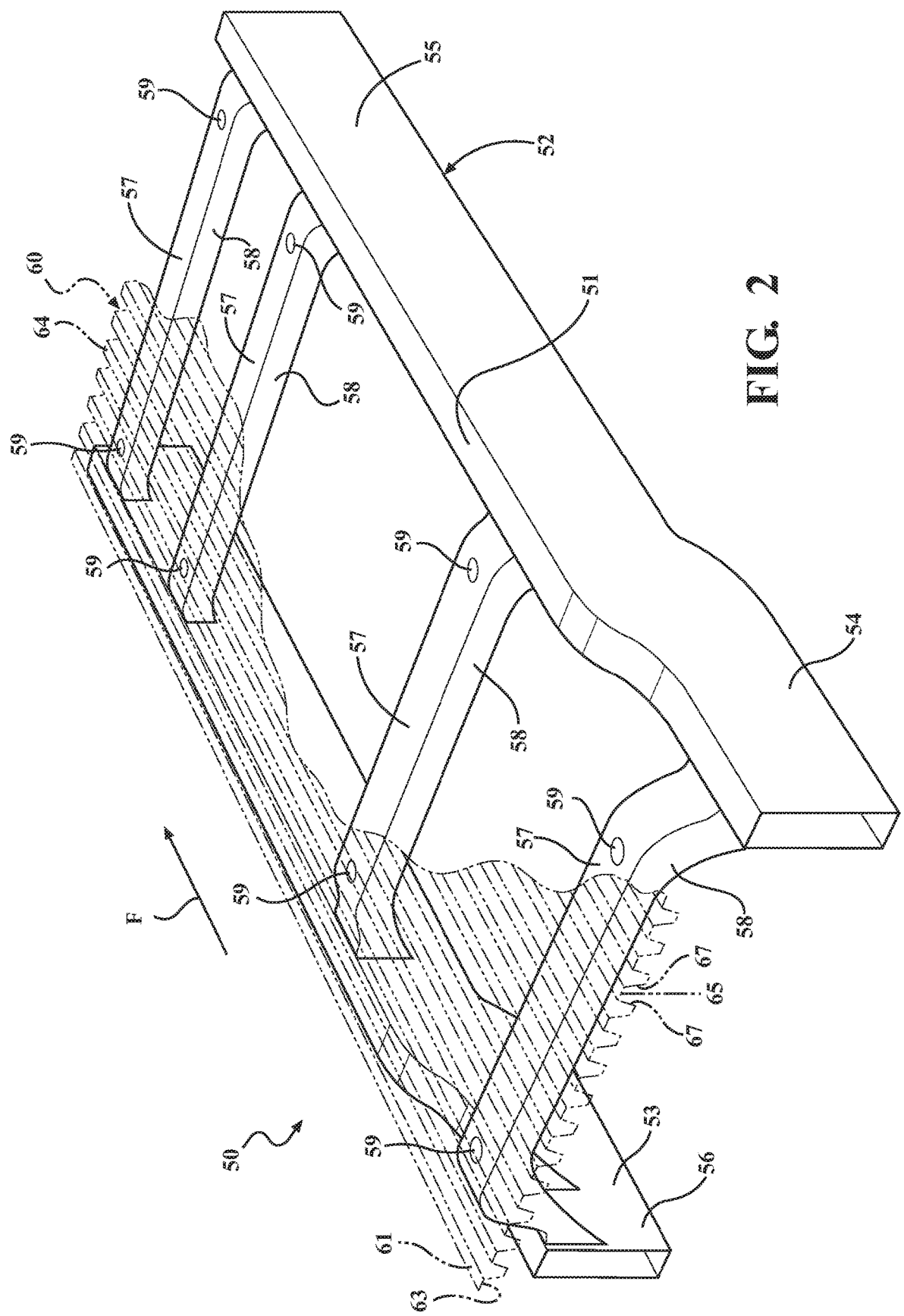
FIG. 2 is a perspective view of an improved frame-to-bed assembly in accordance with the present disclosure.

FIG. 2 is a perspective view an improved frame-to-bed assembly 50, in accordance with the present disclosure. The frame-to-bed assembly 50 includes a frame 52 that has two parallel side rails 54, 56 that extend in a first direction F, and are connected to one another by way of a plurality of cross-members 58. The rails 54, 56 each have a top surface 51, an inside surface 53, and an outside surface 55. The cross-members 58 extend between the inside surfaces 53 of the rails 54, 56. The plurality of cross-members 58 each have an upper surface 57 with edges that preferably are aligned flush with the top surface 51 of the rails 54, 56. The upper surface 57 of each of the cross-members 58 defines a pair of openings 59. It should be appreciated that more or fewer openings 59 could be defined by the cross-members 58. The edges of the upper surface 57 of the cross-members are preferably flush with the top surface 51 of the rails 54, 56. Furthermore, a bed 60 is disposed over rails 54, 56 and the cross-members 58. The bed 60 has a top surface 61 and a bottom surface 63 and defines a plurality of corrugations 64 that extend in the first direction F across the length of the bed 60. The corrugations 64 are designed to distribute the weight of the items in the bed 60 and to channel water out of the bed 60. As illustrated, the plurality of corrugations 64 may have a half hexagon-like shape, however, it should be appreciated that other shapes could be utilized including, but not limited to a half honeycomb, or half square-like shape. Each of the corrugations 64 has a generally planar base portion 65 and a pair of wings 67 that extend from the base portion 65 at an angle relative to the base portion 65. The bed 60 also has side walls (not shown) assisting in supporting items that are positioned in the bed 60.

FIG. 3 is a sectional, magnified view of an improved attachment assembly 70 in accordance with the present disclosure which interconnects the cross-member 58 to the bed 60. It should be appreciated that any number of the subject attachment assemblies 70 could be utilized. It should also be appreciated that the subject attachment assembly 70 could interconnect the bed 60 to other parts of the frame, such as the rails 54, 56. Each attachment assembly 70 includes a mounting bracket 76, the openings 59 defined by the cross-member 58, and a fastener 72, 74. The mounting bracket 76 has a plate portion 77 that defines an aperture 79. As illustrated, the plate portion 77 has a generally square shape in the example embodiment, however, it should be appreciated that it could have other shapes including, but not limited to, a circular or rectangle shape. The mounting bracket 76 further has a pair of arms 78 that extend at an angle relative to the plate portion 77. The arms 78 are each fixed to one of the wings 67 of one of the corrugations 64. In the example embodiment the arms 78 are fixed to the wings 67 with a weldment 83, however, it should be appreciated that the arms 78 could be fixed to the wings 67 with other connecting mechanisms including, but not limited to, adhesives or screws. Furthermore, it should be appreciated that the term "fixed" as used herein may encompass the arms 78 being integrally connected to the wings 67. Preferably the arms 78 extend at the same angle as the wings 67 of the corrugations 64 such that the arms 78 are disposed flush with the wings 67 to ensure a tight fit therein. In the example embodiment, two arms 78 are positioned on opposite sides of the plate portion 77, however, it should be appreciated that the arms 78 could also extend from other areas of the plate portion 77, e.g., around the entire outer perimeter of the plate portion 77. The fastener 72, 74 further includes a nut 72 that is secured to the plate portion 77 of the mounting bracket 76 in alignment with the aperture 79. In the example embodiment, the nut 72 is secured to the plate portion 77 with a weldment 81, however, it should be appreciated that the nut 72 could be secured to the plate portion 77 with other fastening means including, but not limited to, an adhesive. The fastener also includes a bolt 74 that is configured to extend through the opening 59 of the cross-member 58 and the aperture 79 of the mounting bracket 76. The bolt 74 is threaded securely to the nut 72 to secure the bed 60 to the cross-member 58. It should be appreciated that other types of fasteners could be utilized to attach the mounting bracket 76 to the cross-member 58 including, but not limited to, rivets, screws and adhesives.

To assemble the frame-to-bed assembly 50, the bolt 74 is inserted into the opening 59 of the cross-member 58. Thereafter, the mounting bracket 76 is place over and around the shaft 80 of the bolt 74 via the aperture 79, and the bolt is threaded through the nut 72. The wings 67 of a corrugation 64 along the bottom side 63 of the bed 60 are connected to the arms 78 of mounting bracket 76 with a weldment 83 to fix the corrugation 64 to the mounting bracket 76. It should be appreciated that once assembled, the fastener 72, 74 is covered by the corrugation 64 such that a clean connection is provided that may not be contacted by items that are stored in the bed 60, as further illustrated in FIG. 3.

It should be appreciated that the subject improved frame-to-bed assembly 50 eliminates the need for cross-sills from supporting the pickup bed as well as eliminates the need for brackets on the frame to support the cross-sills. As a result, the overall mass and torsional loading of the pickup truck is reduced and cost associated with the cross-sill and brackets is reduced. Specifically, the weight of the truck is reduced by six to ten kilograms. Additionally, the improved frame-to-bed assembly 50 may reduce noise coming from the pickup bed since the cross-sills are no longer required. Further, the floor of the pickup bed is lowered around 55 millimeters due to the elimination of the cross-sill and therefore, increases pickup box volume as well as makes the truck easier to load and unload due to the lowered floor. The center of gravity of the vehicle is also lowered due to the floor being lowered.

Figure 4A:
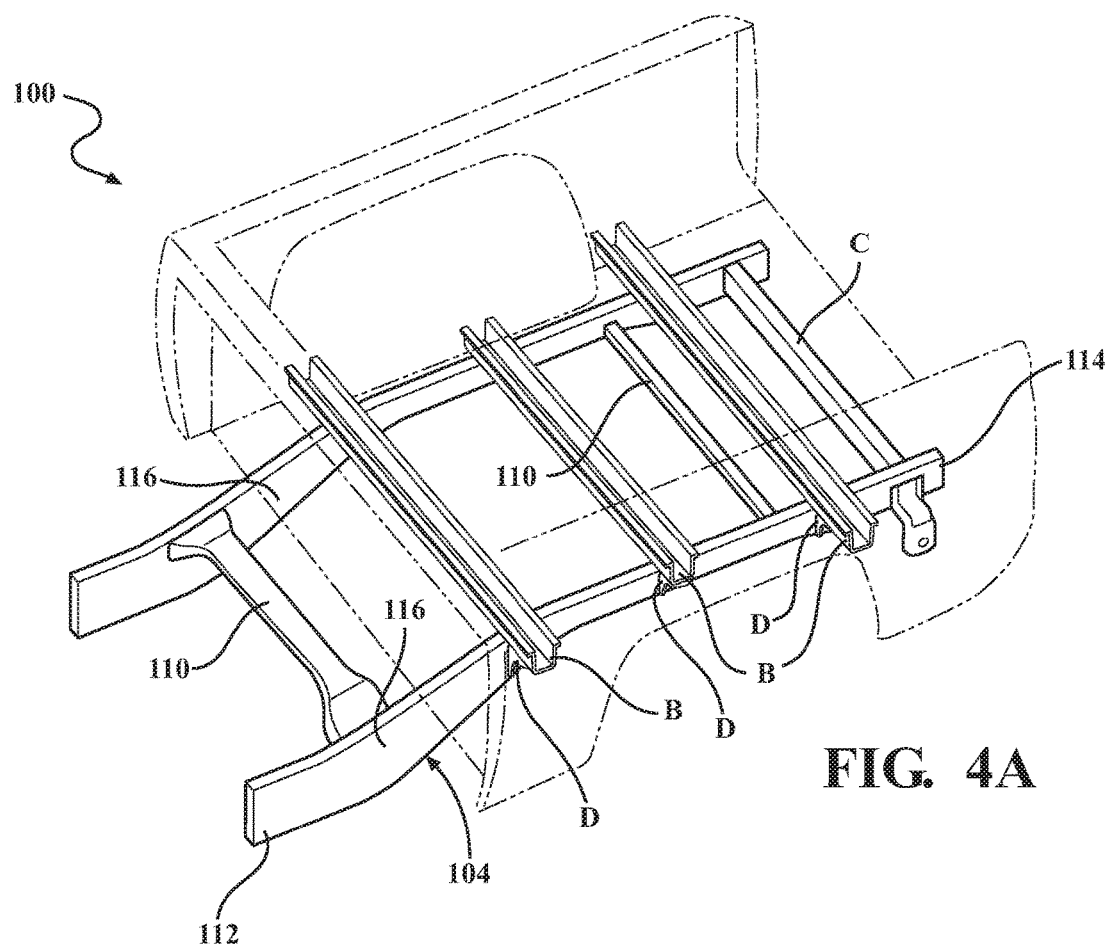
FIG. 4A is a perspective view of a current frame-to-bed assembly, illustrating the cross-sills, cross-members and brackets that may be removed as a result of the incorporation of an improved attachment assembly.
Figure 4B:
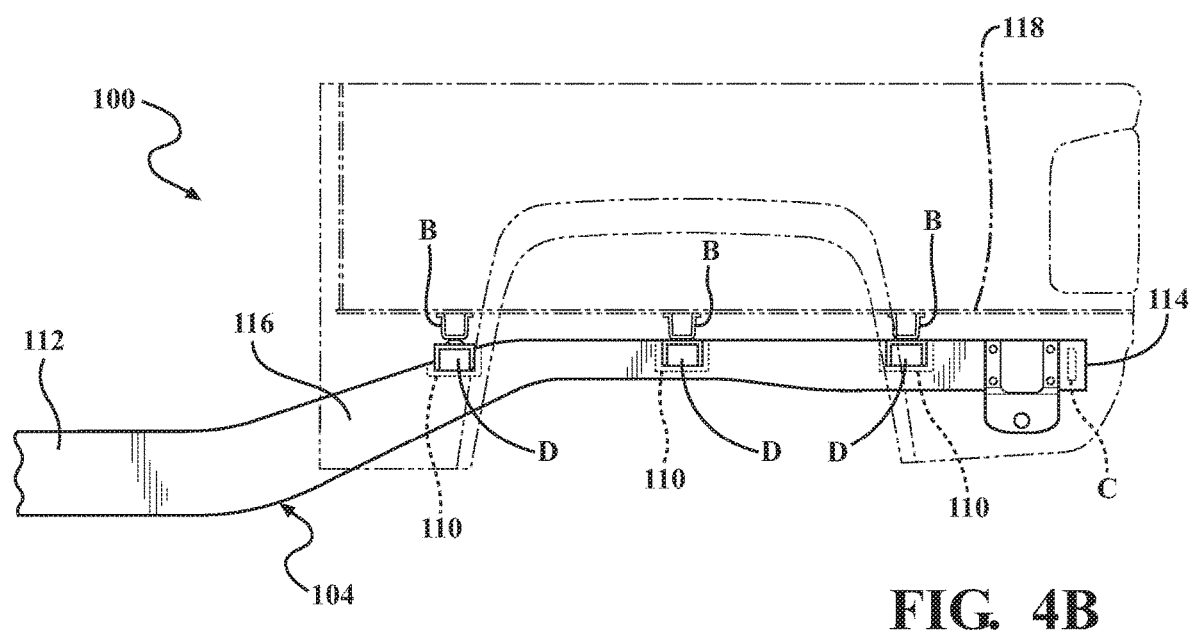
FIG. 4B is a side view of the current frame-to-bed assembly of FIG. 4A.

According to another aspect of the disclosure, FIGS. 4A and 4B present perspective and side views of a frame-to-bed assembly 100 that illustrates the cross-sills B, cross-member C, and brackets D that may be removed from the frame-to bed assembly 100 because of the incorporation of the subject attachment assembly 70. More specifically, because of the direct connection that is provided between the bed 118 and cross-members 110 by the subject attachment assembly 70, the cross-sills, cross-member and brackets that are labeled as B, C and D, respectively, may be removed from the frame-to-bed assembly 100 to provide reduced weight, reduced noise, reduced costs, etc.

Figure 5:
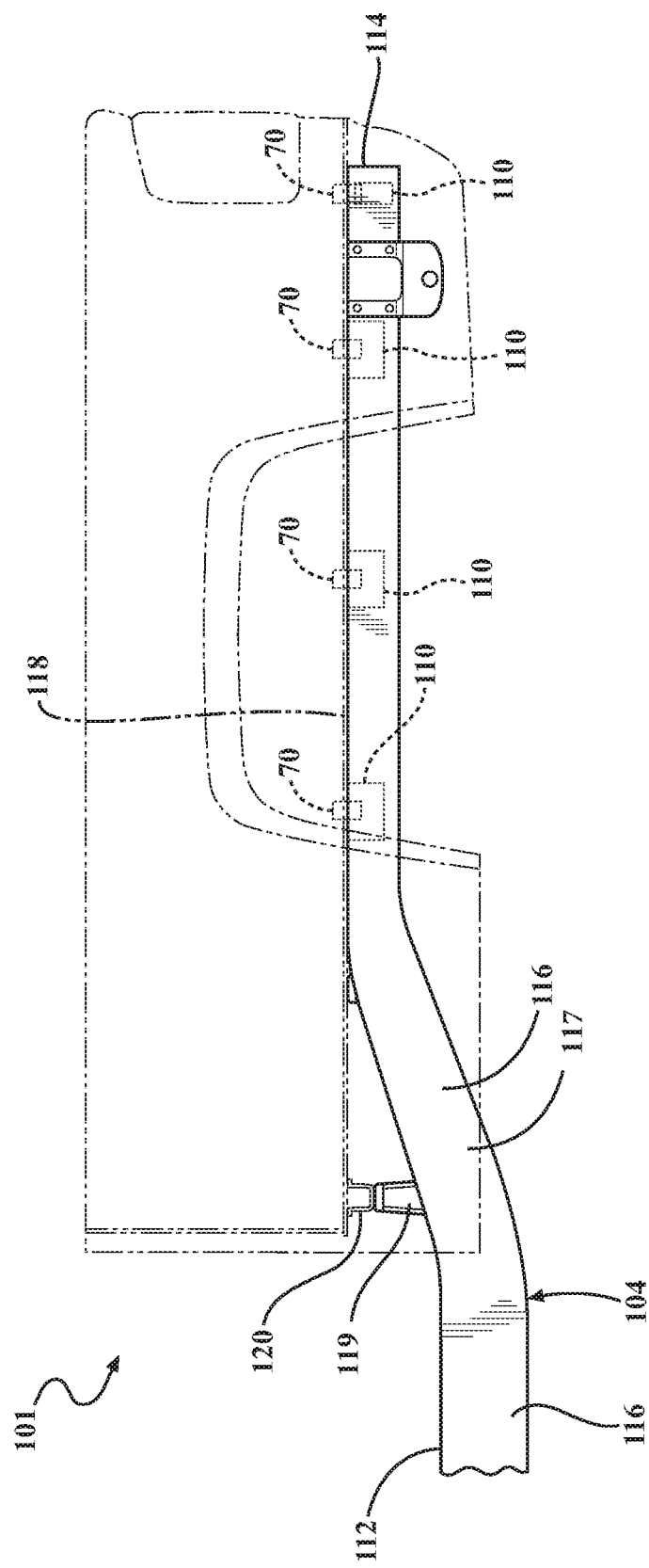
FIG. 5 is a side view of an improved frame-to-bed assembly in accordance with alternative aspect of the present disclose illustrating the use of an improved attachment assembly in conjunction with cross-sills.

With reference to FIG. 5, a side view of an alternate embodiment of a frame-to-bed assembly 101 is presented which utilizes the subject attachment assembly 70 in conjunction with brackets 119 and cross-sills 120 to accommodate height differences between a front portion 112 and back portion 114 of the frame 104. More specifically, the improved frame-to-bed assembly 101 includes a frame 104 with two generally parallel side rails 116 connected to one another through a plurality of cross-members 110. The frame 104 has a front portion 112 and a back portion 114 that are each generally planar and connected to one another through a downward sloped region 117 such that the front and back portions 112, 114 are offset from one another. One or more brackets 119 and cross-sills 120 may be disposed across the sloped region 117 of the frame 104 to engage and attach to the pickup bed 118 while accommodating for the height difference between the front portion 112 and the back portion 114. Furthermore, cross-members 110 and the frame-to-bed attachments 70 (schematically shown) are also used to support the pickup bed 118 and secure the pickup bed 118 to the frame 104.

It should be appreciated that the combination of using brackets 119, cross-sills 120 and cross-members 110, and the frame-to-bed attachment 70 for securing the pickup bed 118 to the frame 104 allows for the assembly 101 to reduce the total mass of the truck by reducing or eliminating the use of multiple or a majority of cross-sills as well as one or more cross-members along the back portion 114 of the frame 104, while accommodating for the height difference between the front portion 112 and the back portion provided by the sloped region 117.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

The invention claimed is:

1. A frame-to-bed assembly for a pickup truck including:
   a frame including a pair of rails extending in spaced relationship with one another;
   at least one cross-member extending between said rails and connecting said rails to one another;
   a bed overlying said at least one cross-member and said rails of said frame and having a top surface and a bottom surface and defining a plurality of corrugations; and
   at least one mounting bracket fixed to said bottom surface of said bed inside one of said corrugations and coupled to said at least one cross-member for interconnecting said bed and said cross-member.

2. A frame-to-bed assembly as set forth in claim 1 wherein each of said corrugations have a base portion and a pair of wings extending from said base portion at an angle relative to said base portion; and wherein said at least one mounting bracket has a plate portion and a pair of arms extending from said plate portion at an angle relative to said plate portion, wherein each of said arms of said at least one mounting bracket are disposed against one of said wings of one of said corrugations.

3. A frame-to-bed assembly as set forth in claim 2 wherein a weldment fixes each of said arms of said mounting bracket to one of said wings of said corrugations.

4. A frame-to-bed assembly as set forth in claim 1 wherein said at least one mounting bracket is integrally connected to said bottom surface of said bed inside one of said corrugations.

5. A frame-to-bed assembly as set forth in claim 2 wherein each of said arms of said at least one mounting bracket are disposed flush with one of said wings of said corrugations.

6. A frame-to-bed assembly as set forth in claim 1 wherein a fastener fixes said at least one mounting bracket to said at least one cross-member.

7. A frame-to-bed assembly as set forth in claim 6 wherein said fastener includes a nut disposed between said at least one mounting bracket and said bottom surface of said corrugation, and a bolt extending through said at least one cross-member and said at least one mounting bracket and threadedly secured to said nut.

8. A frame-to-bed assembly as set forth in claim 7 wherein a weldment fixes said nut to said mounting bracket.

9. A frame-to-bed assembly as set forth in claim 7 wherein said faster is entirely disposed beneath said bottom surface of said bed.

10. A frame-to-bed assembly as set forth in claim 7 wherein said at least one cross-member defines at least one opening; said at least one mounting bracket defines an aperture; and wherein said bolt extends through said at least one opening of said at least one cross-member and said aperture of said at least one mounting bracket.

11. A frame-to-bed assembly as set forth in claim 1 wherein said rails of said frame each have a linear section and a sloped section with said sloped section sloping downwardly from said linear section; and wherein at least one cross-sill extends on top of and between said rails along said sloped section for supporting said bed along said sloped section.

12. A frame-to-bed assembly as set forth in claim 1 wherein said rails of said frame extend in a first direction in spaced and parallel relationship with one another; and wherein said corrugations of said bed extend in said first direction.

13. A frame-to-bed assembly as set forth in claim 1 wherein said at least one mounting bracket is planar and has a square shape.

14. A frame-to-bed assembly as set forth in claim 1 wherein each of said rails have a top surface and an inside surface with said inside surfaces pointed toward one another; and wherein each of said cross-members extend between said inside surfaces of said rails and have an upper surface with edges that are disposed substantially flush with said top surface of said rails.

15. A frame-to-bed assembly as set forth in claim 1 wherein said at least one mounting bracket includes a plurality of mounting brackets connected to said bottom surface of said bed inside a plurality of said corrugations and couples to a plurality of said cross-members.

16. An attachment assembly for a frame-to-bed assembly for a pickup truck, wherein the pickup truck includes a frame having a pair of rails, at least one cross-member extending between the rails, and a bed having a top surface and a bottom surface and defining a plurality of corrugations each having a base and a pair of wings; said frame-to-bed assembly including:
  a mounting bracket including a plate portion and a pair of arms each being fixable to one of the wings of one of the corrugations along the bottom surface of the bed; and
  a fastener fixed to the mounting bracket and fixable to the at least one cross-member to interconnect the bed and the cross-member.

17. An attachment assembly as set forth in claim 16 wherein said fastener includes a nut positionable between said at least one mounting bracket and the bottom surface of the corrugation, and a bolt positionable through said at least one cross-member and said at least one mounting bracket and threadedly secured to said nut.

18. An attachment assembly as set forth in claim 16 wherein a weldment fixes said nut to said mounting bracket.

19. An attachment assembly as set forth in claim 16 wherein said plate portion of said at least one mounting bracket is planar and has a square shape.

20. An attachment assembly as set forth in claim 16 wherein said arms each extend from said plate portion at an angle for being positioned flush with the wings of the corrugation.

* * * * *